(12) United States Patent
Matsushita et al.

(10) Patent No.: US 11,760,389 B2
(45) Date of Patent: Sep. 19, 2023

(54) VEHICLE CONTROLLER DEVICE AND VEHICLE CONTROL SYSTEM

(71) Applicant: TOYOTA JIDOSHA KABUSHIKI KAISHA, Toyota (JP)

(72) Inventors: Makoto Matsushita, Ichinomiya (JP); Atsushi Hanawa, Miyoshi (JP); Yasuki Nakagawa, Toyota (JP); Yusuke Yokota, Susono (JP); Tomoyuki Kuriyama, Hadano (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 16/907,608

(22) Filed: Jun. 22, 2020

(65) Prior Publication Data

US 2021/0016796 A1    Jan. 21, 2021

(30) Foreign Application Priority Data

Jul. 16, 2019    (JP) ................................. 2019-131388

(51) Int. Cl.
*B60W 60/00* (2020.01)
*G05D 1/00* (2006.01)
(Continued)

(52) U.S. Cl.
CPC ...... *B60W 60/005* (2020.02); *B60W 60/0015* (2020.02); *G01C 21/3407* (2013.01);
(Continued)

(58) Field of Classification Search
CPC .......... B60W 60/005; B60W 60/0015; B60W 2420/42; B60W 2420/52; B60W 60/0059;
(Continued)

(56) References Cited

U.S. PATENT DOCUMENTS

| 9,465,388 | B1 * | 10/2016 | Fairfield ............... G05D 1/0044 |
| 2014/0358353 | A1 * | 12/2014 | Ibanez-Guzman ......................... B60W 60/0025 701/23 |

(Continued)

FOREIGN PATENT DOCUMENTS

JP    2018-077649 A    5/2018

*Primary Examiner* — Nadeem Odeh
(74) *Attorney, Agent, or Firm* — Oliff PLC

(57) ABSTRACT

A vehicle controller device including: a communication section configured to perform communication between an operation device external to a vehicle and another vehicle; a memory; and a processor that is coupled to the memory, the processor being configured to: acquire peripheral information regarding a periphery of the vehicle from a peripheral information detection section, generate a travel plan for the vehicle based on the peripheral information of the vehicle, acquire operation information to operate the vehicle from the operation device, control autonomous driving in which the vehicle travels based on the generated travel plan and also control remote driving in which the vehicle travels based on the acquired operation information, acquire peripheral information from the other vehicle in a case in which the processor is unable to acquire peripheral information, and hand over operation authority to the operation device when peripheral information is being acquired by the processor.

3 Claims, 9 Drawing Sheets

(51) Int. Cl.
*G08G 1/00* (2006.01)
*G01C 21/34* (2006.01)

(52) U.S. Cl.
CPC ............ *G05D 1/0027* (2013.01); *G08G 1/22* (2013.01); *B60W 2420/42* (2013.01); *B60W 2420/52* (2013.01)

(58) Field of Classification Search
CPC ............ G01C 21/3407; G05D 1/0027; G05D 2201/0213; G05D 1/0016; G05D 1/0061; G08G 1/22
See application file for complete search history.

(56) References Cited

U.S. PATENT DOCUMENTS

| | | | |
|---|---|---|---|
| 2018/0208211 A1* | 7/2018 | Chiba | B60W 50/082 |
| 2019/0049948 A1* | 2/2019 | Patel | G05D 1/0276 |
| 2019/0179309 A1* | 6/2019 | Mizutani | B60W 50/14 |
| 2019/0236955 A1* | 8/2019 | Hu | G08G 1/096844 |
| 2019/0278298 A1* | 9/2019 | Pedersen | G05D 1/0297 |
| 2020/0047773 A1* | 2/2020 | Akaba | G08G 1/16 |
| 2020/0283024 A1* | 9/2020 | Iwasaki | B60W 30/18163 |
| 2021/0366278 A1* | 11/2021 | Park | G08G 1/093 |

\* cited by examiner

VEHICLE CONTROLLER DEVICE AND VEHICLE CONTROL SYSTEM

CROSS-REFERENCE TO RELATED APPLICATION

This application is based on and claims priority under 35 USC 119 from Japanese Patent Application No. 2019-131388 filed on Jul. 16, 2019, the disclosure of which is incorporated by reference herein.

BACKGROUND

Technical Field

The present disclosure relates to a vehicle controller device capable of executing autonomous driving and remote driving, and a vehicle control system including such a vehicle controller device.

Related Art

Japanese Patent Application Laid-Open (JP-A) No. 2018-77649 discloses a vehicle control system capable of causing remote driving to be executed by an appropriate remote operator. A remote driving control device in this vehicle control system includes a communication section that communicates with a remote operation subject vehicle, a supply section that supplies the remote operator with the vehicle situation received by the communication section, and a reception section that receives driving operation from the remote operator.

The remote driving control device starts remote operation of the vehicle when a driving operation received by the reception section has satisfied a predetermined condition.

The vehicle control system in JP-A No. 2018-77649 is capable of starting remote driving triggered when execution of autonomous driving by the vehicle becomes compromised. However, in this vehicle control system there is a need to guarantee safety in the interval between the execution of autonomous driving becoming compromised and the start of remote driving.

SUMMARY

An object of the present disclosure is to provide a vehicle controller device and a vehicle control system in which driving is safely entrusted to a remote driving operator in a situation in which travel by autonomous driving becomes compromised.

A first aspect is a vehicle controller device including a communication section configured to perform communication between an operation device external to a vehicle and another vehicle, a given-vehicle information acquisition section configured to acquire peripheral information regarding a periphery of the vehicle from a peripheral information detection section, a travel plan generation section configured to generate a travel plan for the vehicle based on the peripheral information of the vehicle, an operation information acquisition section configured to acquire operation information to operate the vehicle from the operation device, a travel control section configured to control autonomous driving in which the vehicle travels based on the travel plan generated by the travel plan generation section and also control remote driving in which the vehicle travels based on the operation information acquired by the operation information acquisition section, an other-vehicle information acquisition section configured to acquire peripheral information from the other vehicle in a case in which the given-vehicle information acquisition section is unable to acquire peripheral information, and a handover section configured to hand over operation authority to the operation device when peripheral information is being acquired by the other-vehicle information acquisition section.

In the vehicle controller device of the first aspect, the travel control section is capable of executing autonomous driving and remote driving. Note that autonomous driving is executed based on the peripheral information that the given-vehicle information acquisition section acquired from the peripheral information detection section, and the travel plan generated by the travel plan generation section. Remote driving is executed based on the operation information transmitted by the operation device and acquired by the operation information acquisition section. The other-vehicle information acquisition section of the vehicle controller device acquires peripheral information from the other vehicle in cases in which the vehicle is unable to acquire peripheral information. Namely, the vehicle controller device is able to continue autonomous driving by acquiring peripheral information from the other vehicle in a situation in which travel by autonomous driving is compromised as a result of being unable to acquire peripheral information. The handover section of the vehicle controller device hands over operation authority of the vehicle to the operation device when the peripheral information is being acquired from the other vehicle. Namely, the vehicle controller device enables processing to switch over from autonomous driving to remote driving to be performed while peripheral information is being acquired from the other vehicle and autonomous driving is still continuing. The vehicle controller device thereby enables driving to be safely entrusted to the remote operation driver.

A vehicle controller device of a second aspect is the vehicle controller device of the first aspect, wherein the communication section is further configured to transmit information to the operation device to indicate that the vehicle is unable to acquire peripheral information in a case in which the given-vehicle information acquisition section has become unable to acquire peripheral information. The travel control section is further configured to switch from autonomous driving to remote driving in a case in which operation authority has been handed over to the operation device and remote driving preparation by the operation device has been completed.

In the vehicle controller device of the second aspect, a switch is made from autonomous driving to remote driving once remote driving preparation by the operation device is complete. The vehicle controller device is thus capable of suppressing switching to remote driving in cases in which a remote operation driver cannot be secured, and in cases in which preparation for operation by the remote operation driver is not yet complete.

A vehicle controller device of a third aspect is the vehicle controller device of the first or the second aspect, wherein the communication section is further configured to receive the operation information from the operation device via the other vehicle.

In the vehicle controller device of the third aspect, remote operation information can be received via the other vehicle, thereby enabling remote driving to be continued even in cases in which communication cannot be established between the operation device and the vehicle controller device due to a communication problem or the like.

A fourth aspect is a vehicle control system including the vehicle controller device of any one of the first to the third aspects, the operation device, the vehicle, installed with the vehicle controller device, and one or more other vehicles with autonomous driving capability.

In the vehicle control system of the fourth aspect, an increase the number of other vehicles capable of autonomous driving enables more opportunities to be secured to continue autonomous driving prior to remote driving.

The present disclosure enables a driving to be safely entrusted to a remote operation driver in situations in which travel by autonomous driving is compromised.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
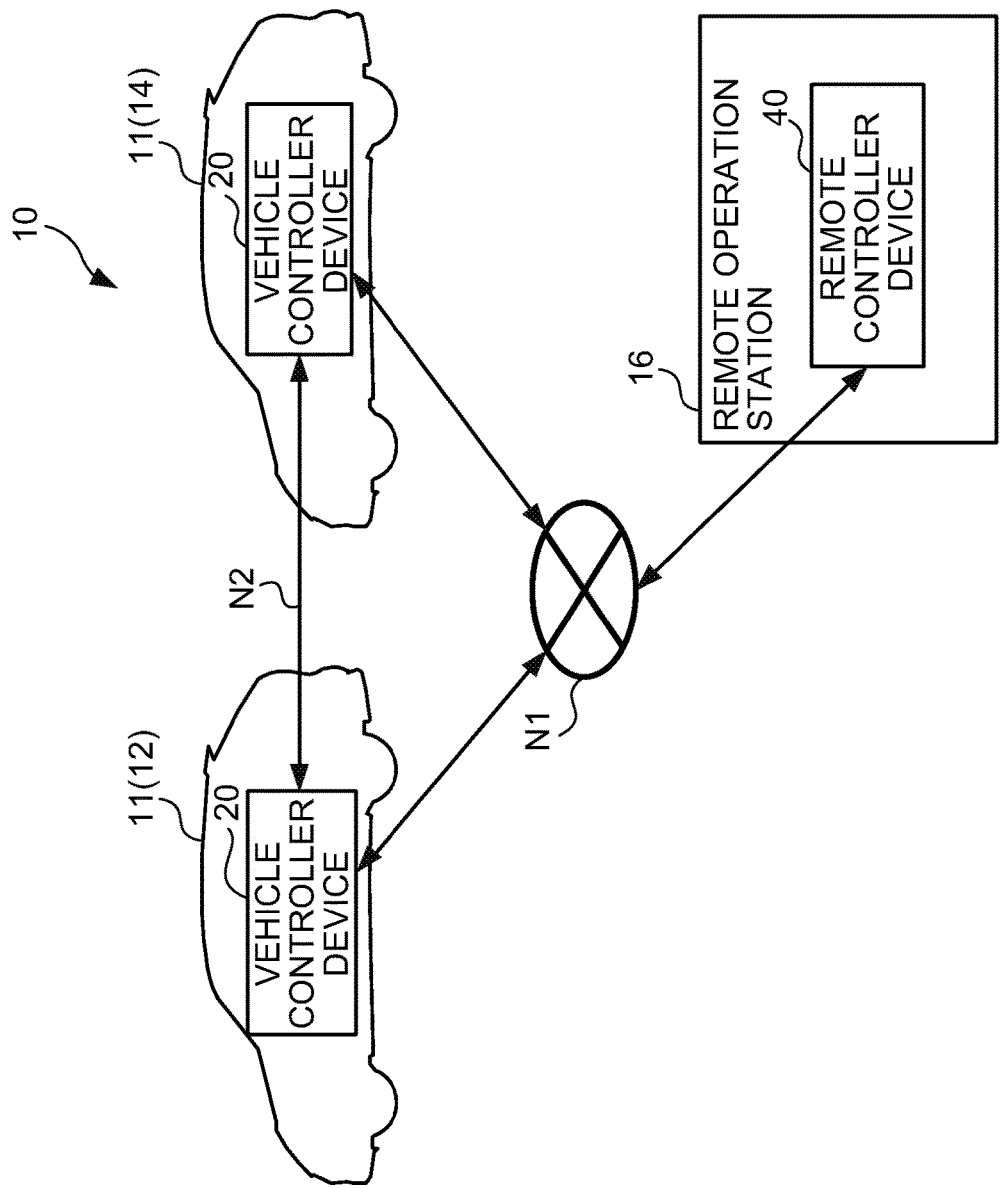
FIG. 1 is a diagram illustrating schematic configuration of a vehicle control system according to a first exemplary embodiment.

FIG. 1 is a block diagram illustrating schematic configuration of a vehicle control system 10 according to a first exemplary embodiment.

Outline

As illustrated in FIG. 1, the vehicle control system 10 according to the first exemplary embodiment includes autonomous driving-enabled vehicles 11, and a remote operation station 16 serving as an operation device. The autonomous driving-enabled vehicles 11 of the present exemplary embodiment include a given vehicle 12 serving as a vehicle, and another vehicle 14 serving as another vehicle.

The given vehicle 12 and the other vehicle 14 of the present exemplary embodiment each include a vehicle controller device 20. The remote operation station 16 includes a remote controller device 40. The vehicle controller device 20 of the given vehicle 12, the vehicle controller device 20 of the other vehicle 14, and the remote controller device 40 of the remote operation station 16 in the vehicle control system 10 are connected together through a network N1. The respective vehicle controller devices 20 are also capable of communicating with each other directly using inter-vehicle communication N2.

Although the vehicle control system 10 in FIG. 1 is configured by two of the autonomous driving-enabled vehicles 11 (the given vehicle 12 and the other vehicle 14) and the one remote operation station 16, the numbers of each are not limited thereto. The vehicle control system 10 may include three or more of the autonomous driving-enabled vehicles 11, and may include two or more of the remote operation stations 16. In the present exemplary embodiment, the given vehicle 12 is one out of a fleet of vehicles that travel on a road, and the other vehicle 14 is a vehicle traveling in the periphery of the given vehicle 12.

The given vehicle 12 is capable of executing autonomous driving in which the given vehicle 12 travels independently based on a travel plan pre-generated by the vehicle controller device 20, remote driving based on operation by a remote driver at the remote operation station 16, and manual driving based on operation by an occupant (namely, a driver) of the given vehicle 12. Note that the other vehicle 14 is also capable of executing autonomous driving by the vehicle controller device 20, remote driving, and manual driving, similarly to the given vehicle 12.

Autonomous Driving-Enabled Vehicle

Figure 2:
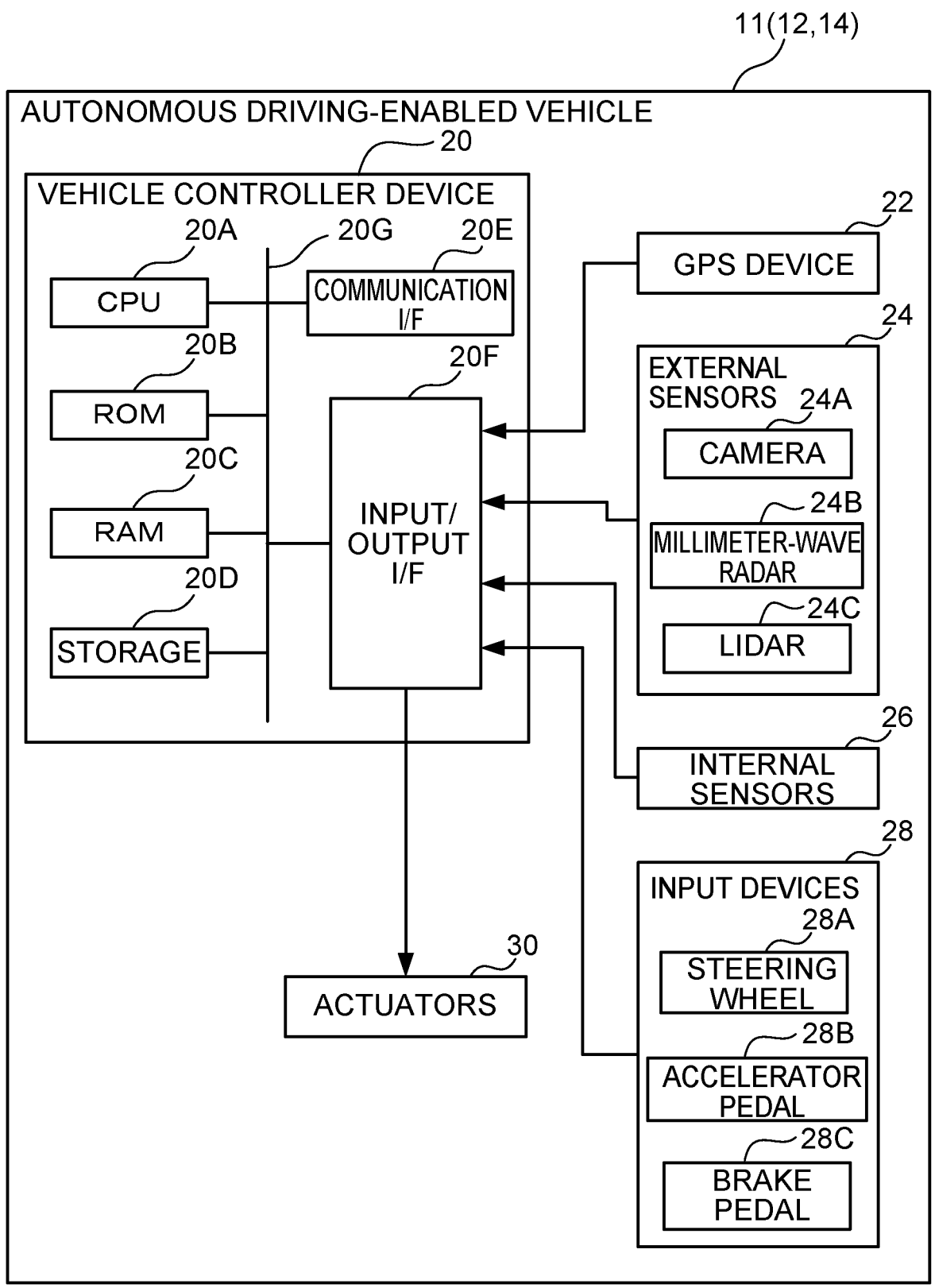
FIG. 2 is a block diagram illustrating hardware configuration of a vehicle of the first exemplary embodiment.

FIG. 2 is a block diagram illustrating hardware configuration of equipment installed in each of the autonomous driving-enabled vehicles 11 in the present exemplary embodiment. Note that since the given vehicle 12 and the other vehicle 14 configuring the autonomous driving-enabled vehicles 11 of the present exemplary embodiment have similar configurations to each other, only the given vehicle 12 will be explained herein. In addition to the vehicle controller device 20 described above, the given vehicle 12 also includes a global positioning system (GPS) device 22, external sensors 24, internal sensors 26, input devices 28, and actuators 30.

The vehicle controller device 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E and the input/output I/F 20F are connected together so as to be capable of communicating with each other through a bus 20G The CPU 20A is an example of a processor, and the RAM 20C is an example of memory.

Figure 3:
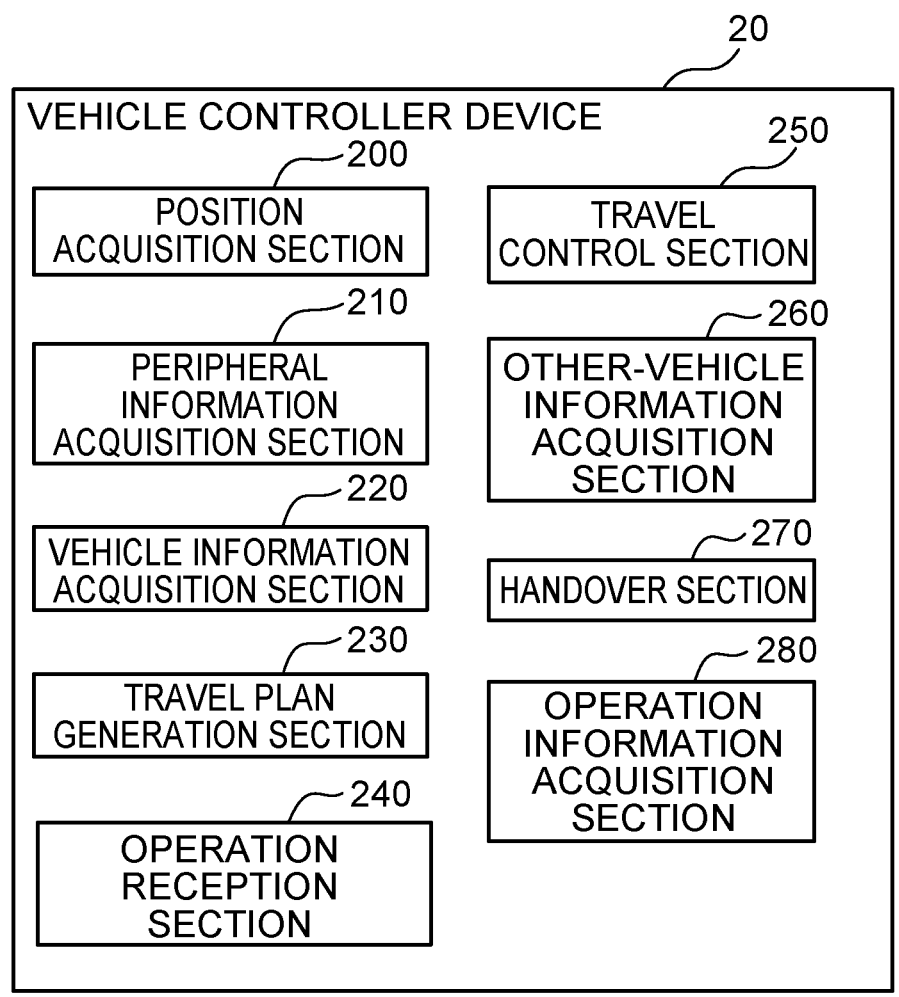
FIG. 3 is a block diagram illustrating an example of functional configuration of a vehicle controller device of the first exemplary embodiment.

The CPU 20A is a central processing unit that executes various programs and controls various sections. Namely, the CPU 20A reads a program from the ROM 20B and executes the program, using the RAM 20C as a workspace. In the present exemplary embodiment, an execution program is stored in the ROM 20B. When the CPU 20A executes the execution program, the vehicle controller device 20 functions as a position acquisition section 200, a peripheral information acquisition section 210, a vehicle information acquisition section 220, a travel plan generation section 230, an operation reception section 240, a travel control section 250, an other-vehicle information acquisition section 260, a handover section 270, and an operation information acquisition section 280, as illustrated in FIG. 3.

As illustrated in FIG. 2, the ROM 20B stores various programs and various data. The RAM 20C serves as a workspace to temporarily store the programs or data.

The storage 20D serves as a storage section, is configured by a hard disk drive (HDD) or a solid state drive (SSD), and stores various programs including an operating system, as well as various data.

The communication I/F 20E serves as a communication section, and includes an interface for connecting to the network N1 in order to communicate with the other vehicle controller device 20, the remote controller device 40, and the like. A communication protocol such as LTE or Wi-Fi (registered trademark) is employed as the interface. Moreover, the communication I/F 20E includes a wireless device to communicate directly with the other vehicle controller device 20 using the inter-vehicle communication N2, employing dedicated short range communications (DSRC) or the like.

The communication I/F 20E of the present exemplary embodiment transmits an image captured by a camera 24A to the remote operation station 16 that is external to the given vehicle 12, and receives remote operation information, this being operation information to operate the given vehicle 12, from the remote operation station 16 through the network N1. The communication I/F 20E is also capable of acquiring peripheral information regarding the periphery of the given vehicle 12 from the other vehicle 14 using the inter-vehicle communication N2.

The input/output I/F 20F is an interface for communicating with the various devices installed in the given vehicle 12. In the vehicle controller device 20 of the present exemplary embodiment, the GPS device 22, the external sensors 24, the internal sensors 26, the input devices 28, and the actuators 30 are connected through the input/output I/F 20F. Note that the GPS device 22, the external sensors 24, the internal sensors 26, the input devices 28, and the actuators 30 may be directly connected together through the bus 20G.

The GPS device 22 is a device for measuring the current position of the given vehicle 12. The GPS device 22 includes an antenna to receive signals from GPS satellites.

The external sensors 24 serve as a peripheral information detection section, and are a group of sensors that detect peripheral information regarding the periphery of the given vehicle 12. The external sensors 24 include the camera 24A that images a predetermined range, millimeter-wave radar 24B that transmits scanning waves over a predetermined range and receives the reflected waves, and laser imaging detection and ranging (LIDAR) 24C that scans a predetermined range.

The internal sensors 26 are a group of sensors that detect travel states of the given vehicle 12. The internal sensors 26 include at least one out of a vehicle speed sensor, an acceleration sensor, or a yaw rate sensor.

The input devices 28 are a group of switches to be operated by the occupant on board the given vehicle 12. The input devices 28 include a steering wheel 28A serving as a switch to steer the steered wheels of the given vehicle 12, an accelerator pedal 28B serving as a switch to cause the given vehicle 12 to accelerate, and a brake pedal 28C serving as a switch to cause the given vehicle 12 to decelerate.

The actuators 30 include a steering wheel actuator to drive the steered wheels of the given vehicle 12, an accelerator actuator to control acceleration of the given vehicle 12, and a brake actuator to control deceleration of the given vehicle 12.

FIG. 3 is a block diagram illustrating an example of functional configuration of the vehicle controller device 20. As illustrated in FIG. 3, the vehicle controller device 20 includes the position acquisition section 200, the peripheral information acquisition section 210, the vehicle information acquisition section 220, the travel plan generation section 230, the operation reception section 240, the travel control section 250, the other-vehicle information acquisition section 260, the handover section 270, and the operation information acquisition section 280. Each of these functional configurations is implemented by the CPU 20A reading the execution program stored in the ROM 20B, and executing this program.

The position acquisition section 200 includes functionality to acquire the current position of the given vehicle 12. The position acquisition section 200 acquires position information from the GPS device 22 through the input/output I/F 20F.

The peripheral information acquisition section 210 serves as a given-vehicle information acquisition section, and includes functionality to acquire peripheral information regarding the periphery of the given vehicle 12. The peripheral information acquisition section 210 acquires peripheral information regarding the given vehicle 12 from the external sensors 24 through the input/output I/F 20F. The "peripheral information" includes not only information regarding vehicles and pedestrians in the surroundings of the given vehicle 12, but also regarding the weather, brightness, road width, obstacles, and so on.

The vehicle information acquisition section 220 includes functionality to acquire vehicle information such as the vehicle speed, acceleration, yaw rate, and so on of the given vehicle 12. The vehicle information acquisition section 220 acquires the vehicle information regarding the given vehicle 12 from the internal sensors 26 through the input/output I/F 20F.

The travel plan generation section 230 includes functionality to generate a travel plan to cause the given vehicle 12 to travel based on the position information acquired by the position acquisition section 200, the peripheral information acquired by the peripheral information acquisition section 210, and the vehicle information acquired by the vehicle information acquisition section 220. The travel plan includes not only a travel route to a pre-set destination, but also information regarding a course to avoid obstacles ahead of the given vehicle 12, the speed of the given vehicle 12, and so on.

The operation reception section 240 includes functionality to receive signals output from the various input devices 28 when manual driving is being performed based on operation by the occupant of the given vehicle 12. The operation reception section 240 also generates vehicle operation information, this being operation information to control the actuators 30, based on signals received from the various input devices 28.

The travel control section 250 includes functionality to control autonomous driving based on the travel plan generated by the travel plan generation section 230, remote driving based on the remote operation information received from the remote operation station 16, and manual driving based on the vehicle operation information received from the operation reception section 240.

The other-vehicle information acquisition section 260 includes functionality to acquire peripheral information from the other vehicle 14 in cases in which peripheral information cannot be acquired by the peripheral information acquisition section 210 of the given vehicle 12. For example, in cases in which the given vehicle 12 is to change lanes in heavy traffic, if the inter-vehicle distance ahead of and behind the given vehicle 12 is short, it may not be possible to acquire peripheral information regarding an overtaking lane. In such cases, the other-vehicle information acquisition section 260 is capable of acquiring peripheral information regarding the overtaking lane from the other vehicle 14 traveling in the overtaking lane.

The handover section 270 includes functionality to hand over operation authority, this being authority to operate the autonomous driving-enabled vehicle 11 to which the vehicle controller device 20 is installed, to the remote operation station 16. The handover section 270 transmits an authority transfer command to the remote operation station 16 in order to confer operation authority of the given vehicle 12 to the remote operation station 16. When operation authority of the given vehicle 12 is transferred to the remote operation station 16, the travel control section 250 of the given vehicle 12 performs remote driving of the given vehicle 12 based on remote operation information received from the remote operation station 16.

The operation information acquisition section 280 includes functionality to acquire the remote operation information from the remote operation station 16 in order to operate the given vehicle 12. More specifically, the operation information acquisition section 280 acquires the remote operation information transmitted from the remote operation station 16 when operation authority has been transferred to the remote operation station 16.

Remote Operation Station

Figure 4:
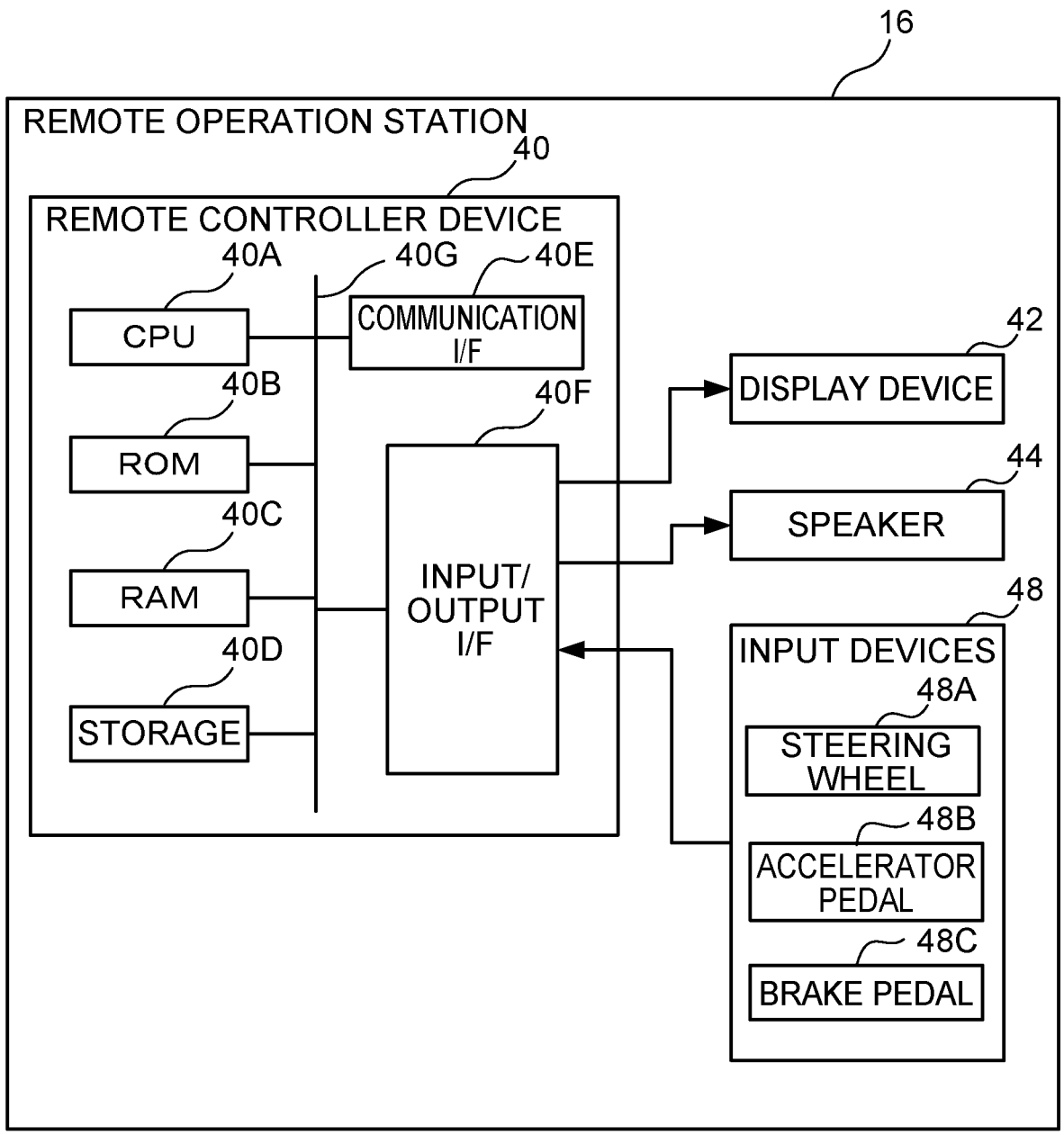
FIG. 4 is a block diagram illustrating hardware configuration of a remote operation station of the first exemplary embodiment.

FIG. 4 is a block diagram illustrating hardware configuration of equipment installed in the remote operation station 16 of the present exemplary embodiment. In addition to the remote controller device 40 previously described, the remote operation station 16 also includes a display device 42, a speaker 44, and input devices 48.

The remote controller device 40 is configured including a CPU 40A, ROM 40B, RAM 40C, storage 40D, a communication I/F 40E and an input/output I/F 40F. The CPU 40A, the ROM 40B, the RAM 40C, the storage 40D, the communication I/F 40E, and the input/output I/F 40F are connected together so as to be capable of communicating with each other through a bus 40G Functionality of the CPU 40A, the ROM 40B, the RAM 40C, the storage 40D, the communication I/F 40E, and the input/output I/F 40F matches that of the CPU 20A, the ROM 20B, the RAM 20C, the storage 20D, the communication I/F 20E, and the input/output I/F 20F of the vehicle controller device 20 previously described.

Figure 5:
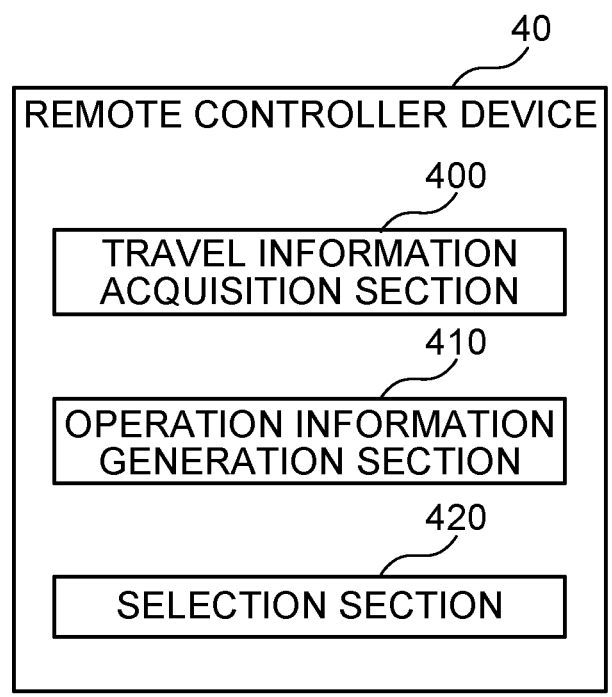
FIG. 5 is a block diagram illustrating an example of functional configuration of a remote controller device of the first exemplary embodiment.

The CPU 40A reads a program from the ROM 40B and executes the program, using the RAM 40C as a workspace. In the present exemplary embodiment, a processing program is stored in the ROM 40B. When the CPU 40A executes the processing program, the remote controller device 40 functions as a travel information acquisition section 400, an operation information generation section 410, and a selection section 420 as illustrated in FIG. 5.

The display device 42, the speaker 44, and the input devices 48 are connected to the remote controller device 40 of the present exemplary embodiment through the input/output I/F 40F. Note that the display device 42, the speaker 44, and the input devices 48 may be directly connected to the bus 40G.

The display device 42 is a liquid crystal monitor for displaying an image captured by the camera 24A of the given vehicle 12 and various information relating to the given vehicle 12.

The speaker 44 is a speaker for replaying audio recorded by a microphone attached to the camera 24A of the given vehicle 12 together with the captured image.

The input devices 48 are controllers to be operated by the remote driver serving as a remote driving operator using the remote operation station 16. The input devices 48 include a steering wheel 48A serving as a switch to steer the steered wheels of the given vehicle 12, an accelerator pedal 48B serving as a switch to cause the given vehicle 12 to accelerate, and a brake pedal 48C serving as a switch to cause the given vehicle 12 to decelerate. Note that the mode of the respective input devices 48 is not limited thereto. For example, a lever switch may be provided instead of the steering wheel 48A. As another example, push button switches or lever switches may be provided instead of the pedal switches of the accelerator pedal 48B or the brake pedal 48C.

FIG. 5 is a block diagram illustrating an example of functional configuration of the remote controller device 40. As illustrated in FIG. 5, the remote controller device 40 includes the travel information acquisition section 400, the operation information generation section 410, and the selection section 420.

The travel information acquisition section 400 includes functionality to acquire audio as well as the image captured by the camera 24A and transmitted by the vehicle controller device 20, and also acquire vehicle information such as the vehicle speed. The acquired captured image and vehicle information are displayed on the display device 42, and the audio information is output through the speaker 44.

The operation information generation section 410 includes functionality to receive signals output from the various input devices 48 when remote driving is being performed based on operation by the remote driver. The operation information generation section 410 also generates remote operation information to be transmitted to the vehicle controller device 20 based on the signals received from the various input devices 48.

The selection section 420 includes functionality to select one remote driver from out of plural remote drivers. Specifically, the selection section 420 executes selection processing to select a remote driver to perform remote driving of the given vehicle 12 on acquisition of an authority transfer command from the vehicle controller device 20. The selection section 420 also executes processing to transmit a preparation complete notification to the vehicle controller device 20 that transmitted the authority transfer command at a stage when a remote driver has been selected and preparation for remote driving is complete, and to start remote operation by the remote operation station 16.

The stage when preparation for remote driving is complete may, for example, correspond to a case in which a sensor has detected that a remote driver has sat down at the remote operation station 16, or a case in which the remote driver has operated a preparation complete button displayed on a touch panel.

Control Flow

In the present exemplary embodiment, the remote driver at the remote operation station 16 is notified when the vehicle controller device 20 of the given vehicle 12 has become unable to acquire peripheral information. A switch to remote driving is performed at a stage when the remote driver has completed preparation for remote driving. Autonomous driving is continued by acquiring peripheral information from the vehicle controller device 20 of the other vehicle 14 in the interval until preparation by the remote driver is complete. Explanation follows regarding switchover processing to switch to remote driving in a case in which the given vehicle 12 has become unable to acquire peripheral information, with reference to the sequence diagram in FIG. 6.

Figure 6:
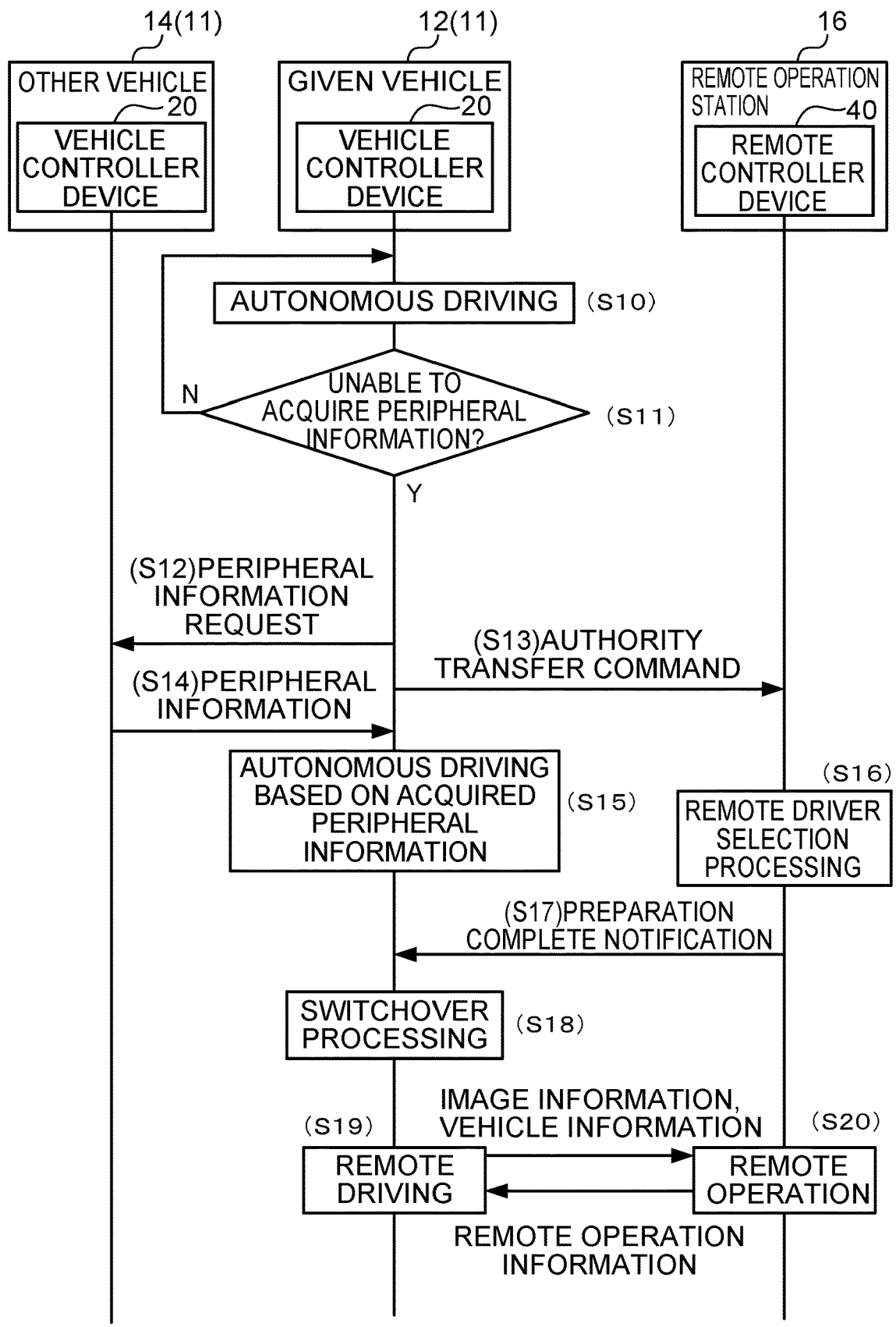
FIG. 6 is a sequence diagram to explain a flow of processing between respective devices of the first exemplary embodiment.

At step S10 in FIG. 6, the CPU 20A of the vehicle controller device 20 of the given vehicle 12 is performing autonomous driving.

At step S11, the CPU 20A of the given vehicle 12 determines whether or not it has become unable to acquire peripheral information. In cases in which the CPU 20A determines that it has become unable to acquire peripheral information, processing proceeds to step S12. In cases in which the CPU 20A determines that it is able to acquire peripheral information, processing returns to step S10. Namely, the CPU 20A continues autonomous driving.

At step S12, the CPU 20A of the given vehicle 12 transmits a command requesting peripheral information to the vehicle controller device 20 of the other vehicle 14.

At step S13, the CPU 20A of the given vehicle 12 transmits an authority transfer command to transfer operation authority of the given vehicle 12 to the remote controller device 40 of the remote operation station 16.

At step S14, the CPU 20A of the other vehicle 14 transmits peripheral information acquired by the external sensors 24 of the other vehicle 14 to the vehicle controller device 20 of the given vehicle 12.

At step S15, the CPU 20A of the given vehicle 12 executes autonomous driving based on the peripheral information acquired from the other vehicle 14.

At step S16, the CPU 40A of the remote operation station 16 executes remote driver selection processing.

At step S17, the CPU 40A of the remote operation station 16 transmits a preparation complete notification indicating that preparation for remote driving by the remote driver is complete to the vehicle controller device 20 of the given vehicle 12.

At step S18, the CPU 20A of the given vehicle 12 executes switchover processing. Namely, a switch from autonomous driving to remote driving is executed.

At step S19, the CPU 20A of the given vehicle 12 starts remote driving. At step S20, the CPU 40A of the remote operation station 16 starts remote operation. Namely, the remote operation station 16 receives images captured by the camera 24A and vehicle information from the internal sensors 26 from the given vehicle 12, and transmits remote operation information to the vehicle controller device 20 of the given vehicle 12 to control the given vehicle 12.

Summary of First Exemplary Embodiment

In the given vehicle 12 of the present exemplary embodiment, the vehicle controller device 20 acquires the peripheral information regarding the periphery of the given vehicle 12 from the external sensors 24 of the given vehicle 12 on a constant basis. In cases in which peripheral information cannot be acquired from the external sensors 24 of the given vehicle 12, for example due to the presence of an obstacle in the periphery of the vehicle 12, the vehicle controller device 20 of the given vehicle 12 acquires peripheral information from the other vehicle 14 traveling in the surroundings of the given vehicle 12. Namely, the vehicle controller device 20 is able to continue autonomous driving by acquiring peripheral information from the other vehicle in a situation in which travel by autonomous driving is compromised as a result of the given vehicle 12 being unable to acquire peripheral information.

The vehicle controller device 20 of the given vehicle 12 hands over operation authority of the given vehicle 12 to the remote operation station 16 when the peripheral information is being acquired from the other vehicle 14. The vehicle controller device 20 is thus capable of performing processing to switch from autonomous driving to remote driving. The vehicle controller device 20 of the present exemplary embodiment is thus capable of acquiring peripheral information from another vehicle to continue autonomous driving even in cases in which peripheral information cannot be acquired by the given vehicle 12, while also starting remote driving by safely entrusting driving to a remote driver.

The vehicle controller device 20 of the present exemplary embodiment switches from autonomous driving to remote driving on receiving the preparation complete notification after the remote controller device 40 of the remote operation station 16 has selected a remote driver and preparation for remote driving has been completed. The vehicle controller device 20 of the present exemplary embodiment is thus capable of suppressing switching to remote driving in cases in which a remote driver cannot be secured, and in cases in which preparation for remote driving by the remote driver has not been completed.

In the vehicle control system 10 of the present exemplary embodiment, the number of potential sources of peripheral information increases the greater the number of vehicles installed with the vehicle controller device 20. Namely, this enables more opportunities to be secured to continue autonomous driving prior to remote driving.

Second Exemplary Embodiment

Figure 7:
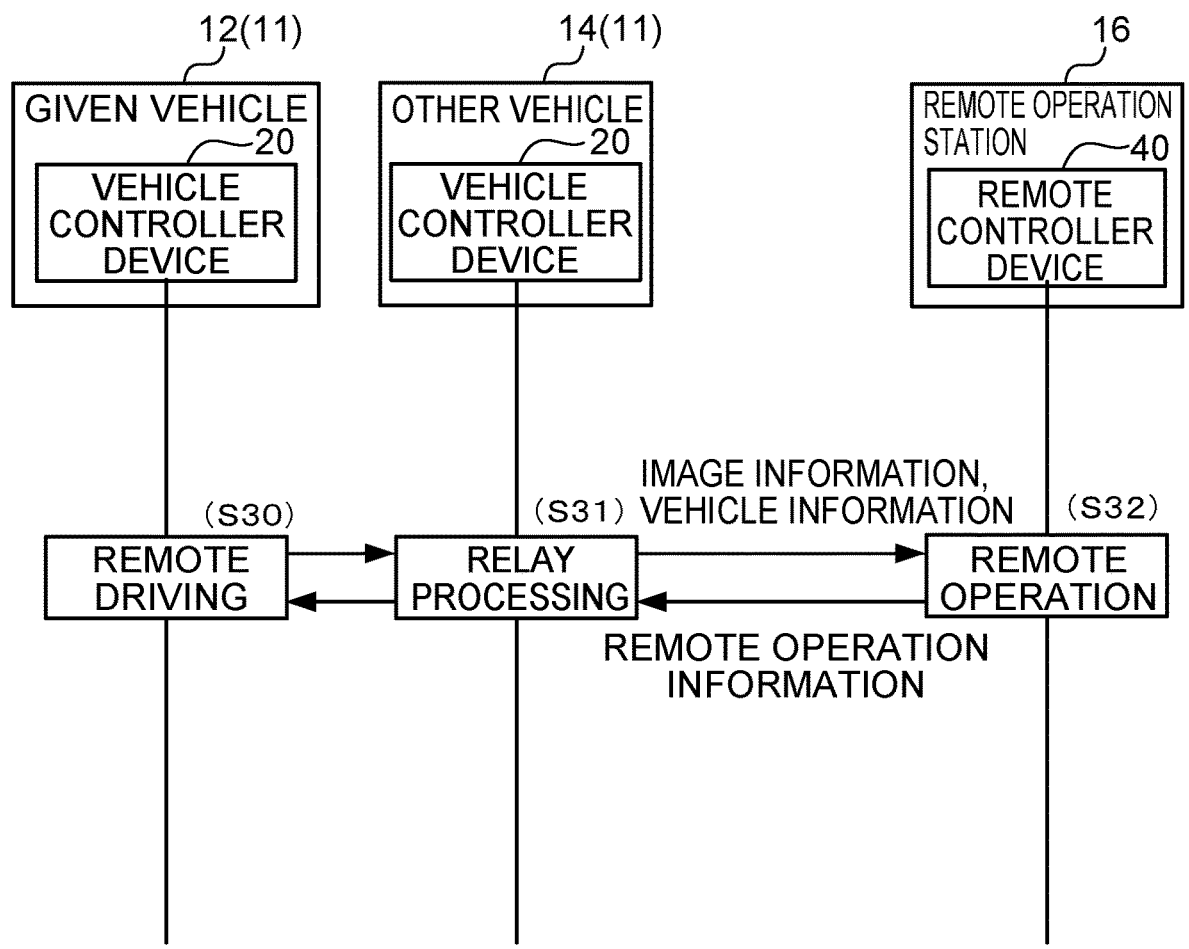
FIG. 7 is a sequence diagram to explain a flow of processing between respective devices of a second exemplary embodiment.

In the first exemplary embodiment, the remote operation information is transmitted from the remote controller device 40 of the remote operation station 16 to the vehicle controller device 20 of the given vehicle 12. By contrast, in a second exemplary embodiment configuration is made such that remote operation information is transmitted via the vehicle controller device 20 of the other vehicle 14 in cases in which communication problems have arisen between the remote controller device 40 and the vehicle controller device 20 of the given vehicle 12. Explanation follows regarding a flow of processing between the respective devices of the second exemplary embodiment, with reference to the sequence diagram in FIG. 7.

In the present exemplary embodiment, the processing of step S30 to step S32 is executed instead of the processing of step S19 and step S20 of the first exemplary embodiment.

At step S30, the CPU 20A of the given vehicle 12 starts remote driving. Then, at step S32 the CPU 40A of the remote operation station 16 starts remote operation. When this is performed, the CPU 20A of the other vehicle 14 executes relay processing to relay information to be communicated between the vehicle controller device 20 of the given vehicle 12 and the remote controller device 40 (step S31).

Namely, the remote operation station 16 receives images captured by the camera 24A and vehicle information from the internal sensors 26 from the given vehicle 12 via the vehicle controller device 20 of the other vehicle 14. Conversely, the vehicle controller device 20 of the given vehicle 12 receives remote operation information from the remote controller device 40 to control the given vehicle 12 via the vehicle controller device 20 of the other vehicle 14.

Similarly, transmission of the authority transfer command (step S13) from the vehicle controller device 20 of the given vehicle 12 to the remote controller device 40, and transmission of the preparation complete notification from the remote controller device 40 to the vehicle controller device 20 of the given vehicle 12 (step S17) may be performed via the vehicle controller device 20 of the other vehicle 14.

As described above, the present exemplary embodiment enables communication to be secured via the vehicle controller device 20 of the other vehicle 14 even in cases in which a communication problem arises between the vehicle controller device 20 of the given vehicle 12 and the remote controller device 40 of the remote operation station 16. This enables remote driving of the given vehicle 12 to be continued. Note that when the communication situation between the vehicle controller device 20 of the given vehicle 12 and the remote controller device 40 improves, the relay processing employing the vehicle controller device 20 of the other vehicle 14 may be ended so as to switch back to direct communication between the vehicle controller device 20 of the given vehicle 12 and the remote controller device 40.

Third Exemplary Embodiment

In the exemplary embodiments described above, in cases in which the vehicle controller device 20 of the given vehicle 12 is unable to acquire peripheral information, the peripheral information is acquired from the vehicle controller device 20 of the single other vehicle 14. However, a third exemplary embodiment enables peripheral information to be acquired from the respective vehicle controller devices 20 of plural vehicles. Moreover, in the third exemplary embodiment, the vehicle controller device 20 of the given vehicle 12 is also capable of acquiring peripheral information from a detection device 50 installed to a installed object 18, for example a monitoring camera installed at a crossroad, or a CCTV camera installed in a shop.

Explanation follows regarding points of difference to the first exemplary embodiment. Note that equivalent configurations are allocated the same reference numerals, and detailed explanation thereof is omitted.

Figure 8:
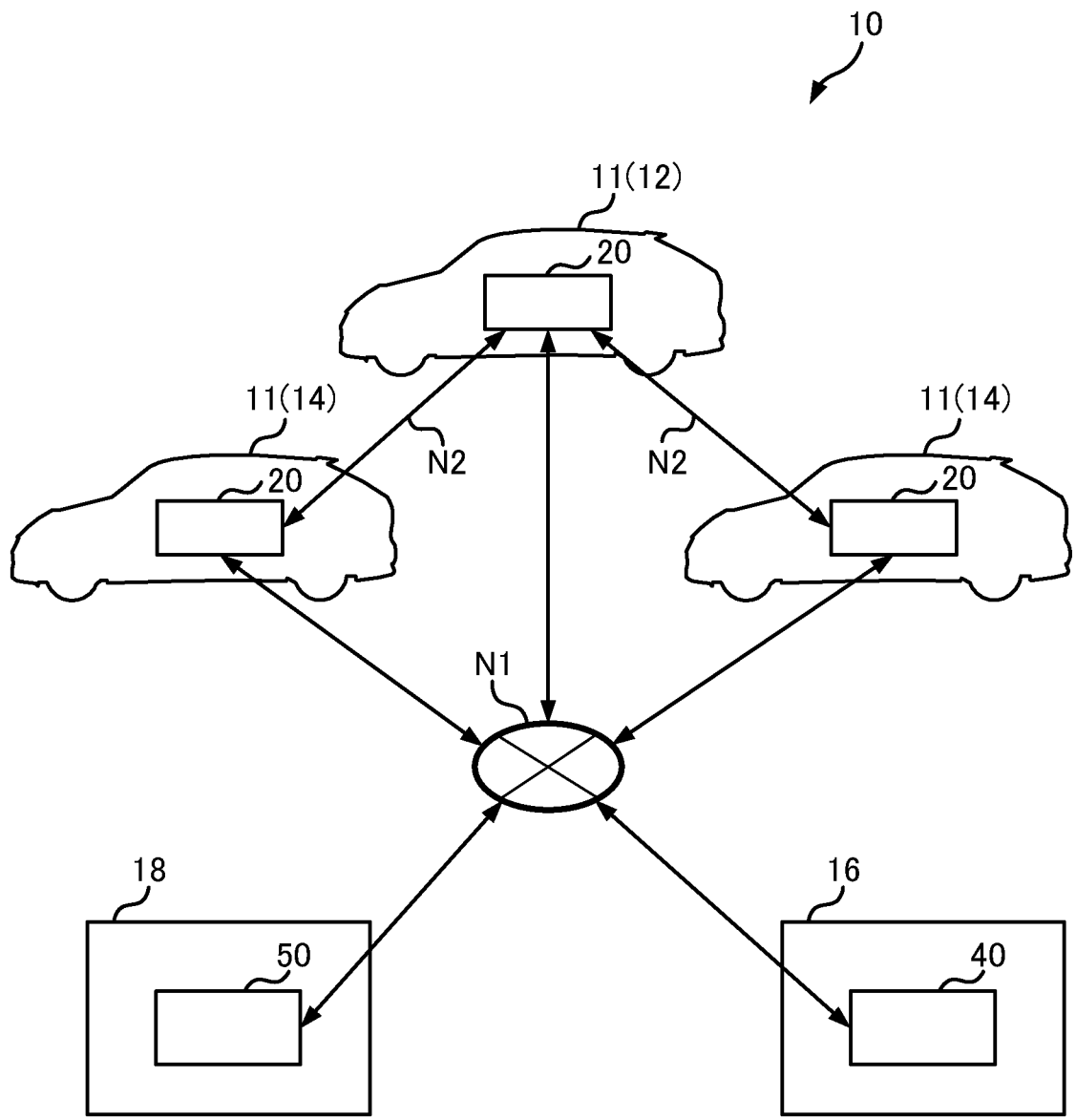
FIG. 8 is a diagram illustrating schematic configuration of a vehicle control system according to a third exemplary embodiment.

As illustrated in FIG. 8, a vehicle control system 10 according to the third exemplary embodiment is configured including plural autonomous driving-enabled vehicles 11, a remote operation station 16 serving as an operation device, and the installed object 18. Although only a single installed object 18 is illustrated, plural installed objects 18 may be present.

Figure 9:
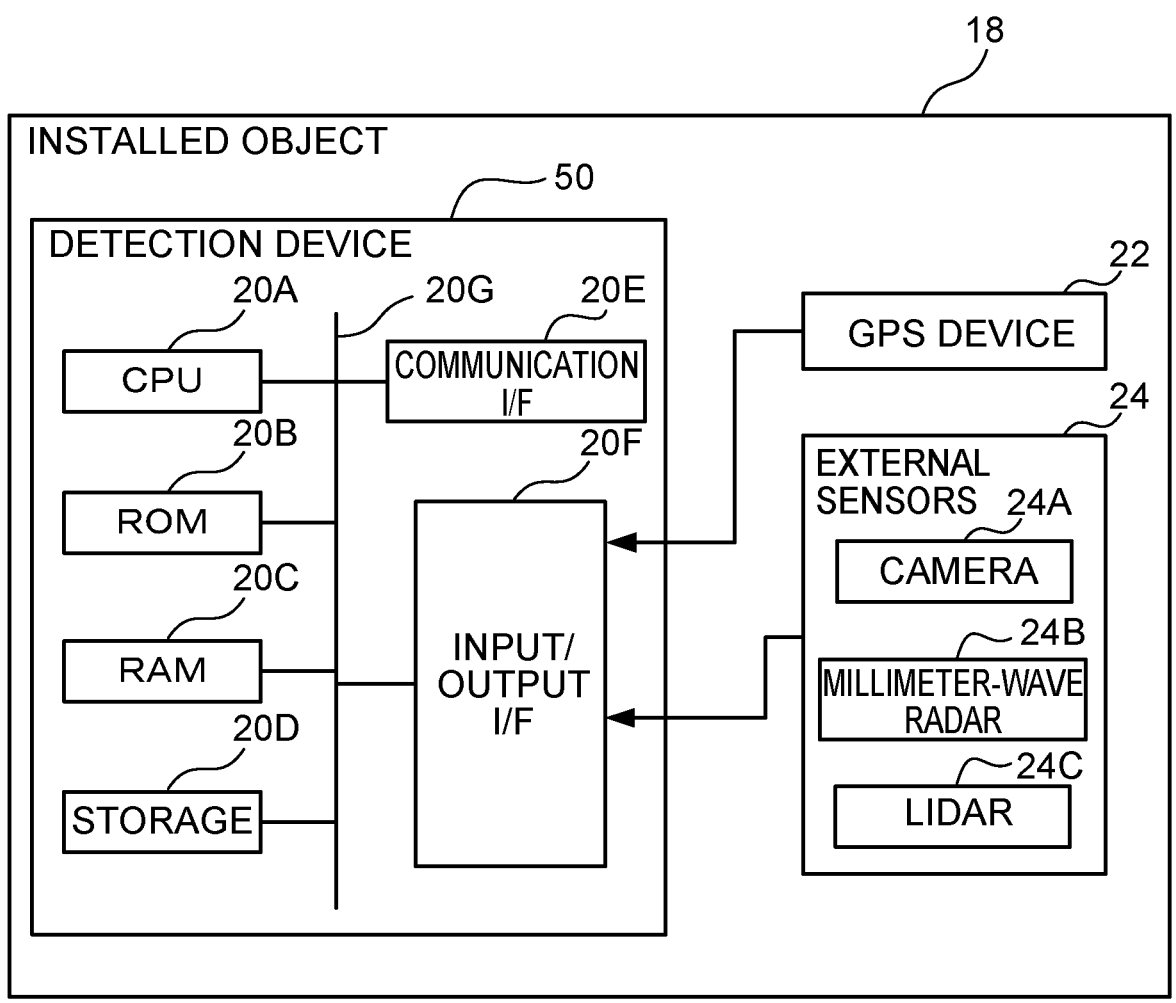
FIG. 9 is a block diagram illustrating hardware configuration of an installed object of the third exemplary embodiment.

As illustrated in FIG. 9, the installed object 18 includes the detection device 50. The detection device 50 is configured including a CPU 20A, ROM 20B, RAM 20C, storage 20D, a communication I/F 20E, and an input/output I/F 20F. A GPS device 22 and external sensors 24 are connected to the input/output I/F 20F of the detection device 50. Note that it is sufficient that the detection device 50 be provided with at least a camera 24A.

When the CPU 20A of the detection device 50 of the present exemplary embodiment receives a command requesting peripheral information from the given vehicle 12, the detection device 50 transmits peripheral information to the vehicle controller device 20 of the given vehicle 12. The present exemplary embodiment exhibits similar operation and advantageous effects to those of the first exemplary embodiment.

Notes

Although explanation has been given in which the remote driver handling the given vehicle 12 serves as a remote driving operator performing remote operation in the exemplary embodiments described above, there is no limitation thereto. An operator issuing instructions relating to the course, speed, and the like of the given vehicle 12 may be present as a remote driving operator performing remote operation.

Note that the various processing executed by the CPU 20A reading software (a program), and the various processing executed by the CPU 40A reading software (a program) in the exemplary embodiments described above may be executed by various processors other than CPUs. Examples of such processors include programmable logic devices (PLDs) such as field-programmable gate arrays (FPGAs) that have a circuit configuration that can be modified following manufacture, or dedicated electrical circuits, these being processors such as application specific integrated circuits (ASICs) that have a custom designed circuit configuration to execute specific processing. The various processing may be executed using one of these processors, or may be executed by a combination of two or more processors of the same type or different types to each other (for example a combination of plural FPGAs, or a combination of a CPU and an FPGA). A more specific example of a hardware structure of these various processors is electric circuitry combining circuit elements such as semiconductor elements.

The exemplary embodiments described above describe a format in which the programs are stored (installed) in advance on a non-transitory computer-readable recording medium. For example, the execution program employed by the vehicle controller device 20 of the autonomous driving-enabled vehicles 11 is stored in advance in the ROM 20B. The processing program employed by the remote controller device 40 of the remote operation station 16 is stored in advance in the ROM 40B. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the respective programs may be configured in a format to be downloaded from an external device through a network.

The flows of processing in the exemplary embodiments described above are given as examples, and unnecessary steps may be omitted, new steps added, and the processing sequence rearranged within a range not departing from the spirit thereof

What is claimed is:

1. A vehicle controller device comprising:
    a communication interface configured to perform communication between an operation device external to a vehicle and another vehicle;
    a memory; and
    a processor that is coupled to the memory,
    the processor being configured to:
        acquire peripheral information regarding a periphery of the vehicle from a peripheral information detection section,
        generate a travel plan for the vehicle based on the peripheral information of the vehicle,
        acquire operation information to operate the vehicle from the operation device,
        control autonomous driving in which the vehicle travels based on the generated travel plan and also control remote driving in which the vehicle travels based on the acquired operation information,
        acquire second peripheral information from the another vehicle in a case in which the processor is unable to acquire the peripheral information from the peripheral information detection section, and
        hand over operation authority to the operation device when the second peripheral information is being acquired by the processor, wherein:
    in a case in which the processor has become unable to acquire the peripheral information from the peripheral information detection section, the processor automatically transmits, via the communication interface, (i) a request to the another vehicle to acquire the second peripheral information and (ii) another request to the operation device to hand over the operation authority, the another request to the operation device indicating that the vehicle is unable to acquire the peripheral information from the peripheral information detection section and thereby requesting to hand over the operation authority to the operation device, the processor switches from the autonomous driving to the remote driving in a case in which the operation authority has been handed over to the operation device and remote driving preparation by the operation device has been completed, and, until the remote driving preparation is completed, the processor continues the autonomous driving based on the second peripheral information acquired from the another vehicle instead of the peripheral information acquired from the peripheral information detection section, the processor determines that the remote driving preparation is completed when a remote driver has sat down at the operation device or the remote driver has operated a preparation complete button provided at the operation device, and the processor is configured to acquire additional second peripheral information from a monitoring camera provided at a facility at the periphery of the vehicle.

2. The vehicle controller device of claim 1, wherein the communication interface is further configured to receive the operation information from the operation device via the another vehicle, and wherein the processor is configured to control the remote driving in which the vehicle travels based on the operation information received from the operation device via the another vehicle.

3. A vehicle control system comprising:

the vehicle controller device of claim 1;

the operation device;

the vehicle, installed with the vehicle controller device; and the another vehicle being one or more vehicles with autonomous driving capability.

\* \* \* \* \*